Figure 9:
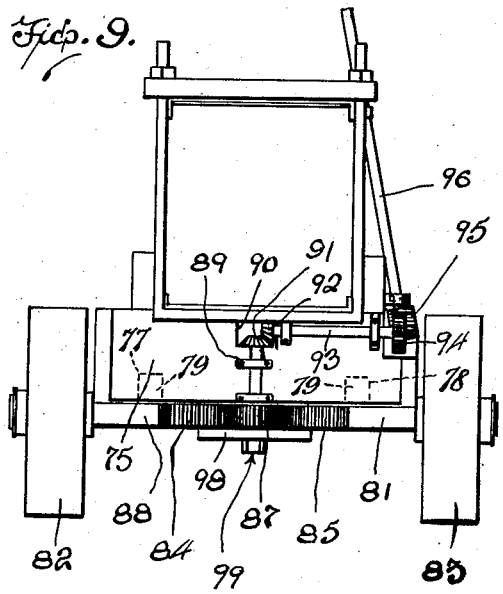

W. E. GADDIS.
HAY RAKE AND BALER.
APPLICATION FILED OCT. 2, 1915.
1,212,044.
Patented Jan. 9, 1917.
9 SHEETS—SHEET 1.
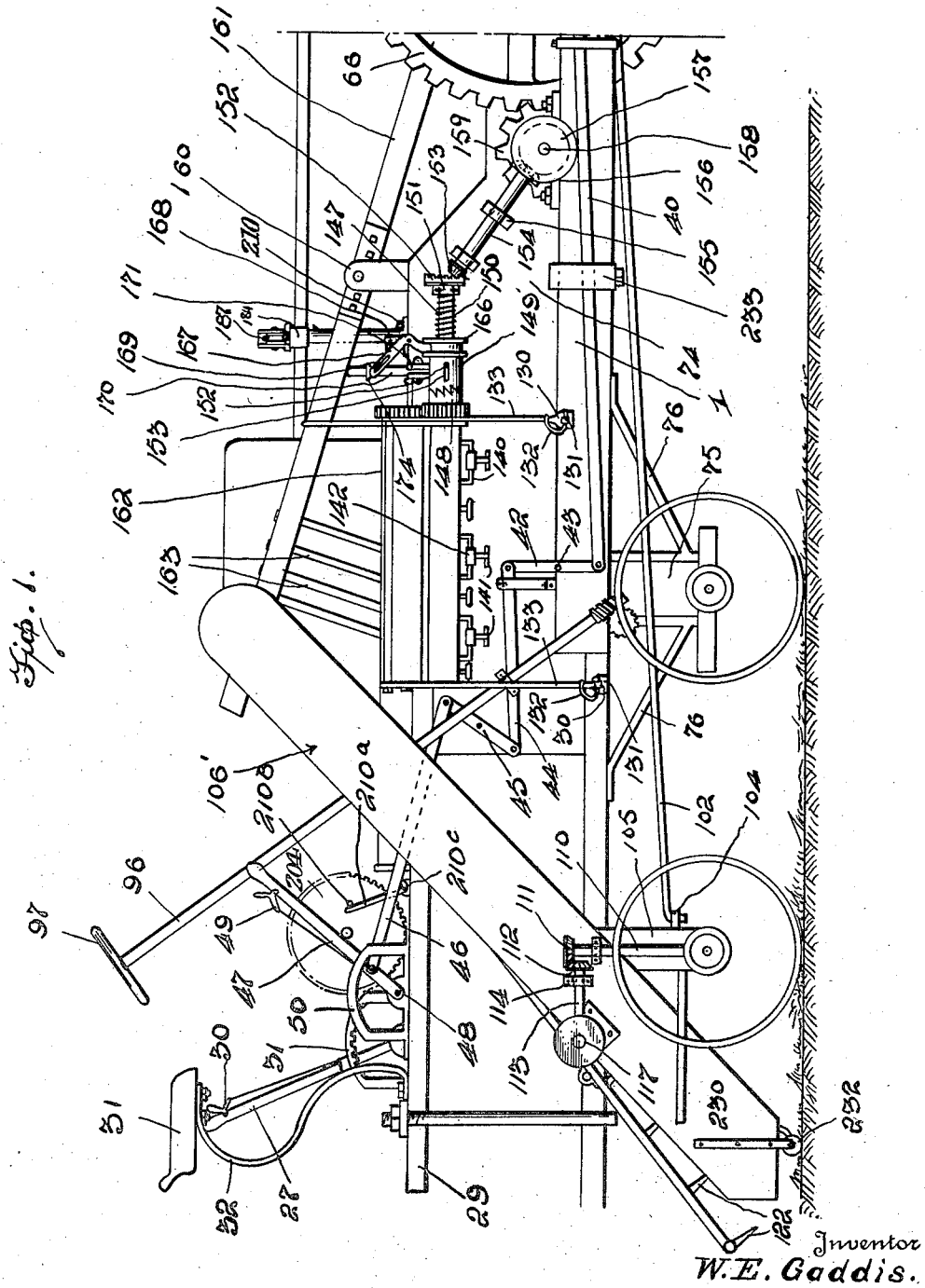
Witnesses
Inventor
W. E. Gaddis.
By 
Attorney W. E. GADDIS.
HAY RAKE AND BALER.
APPLICATION FILED OCT. 2, 1915.
1,212,044.
Patented Jan. 9, 1917.
9 SHEETS—SHEET 2.
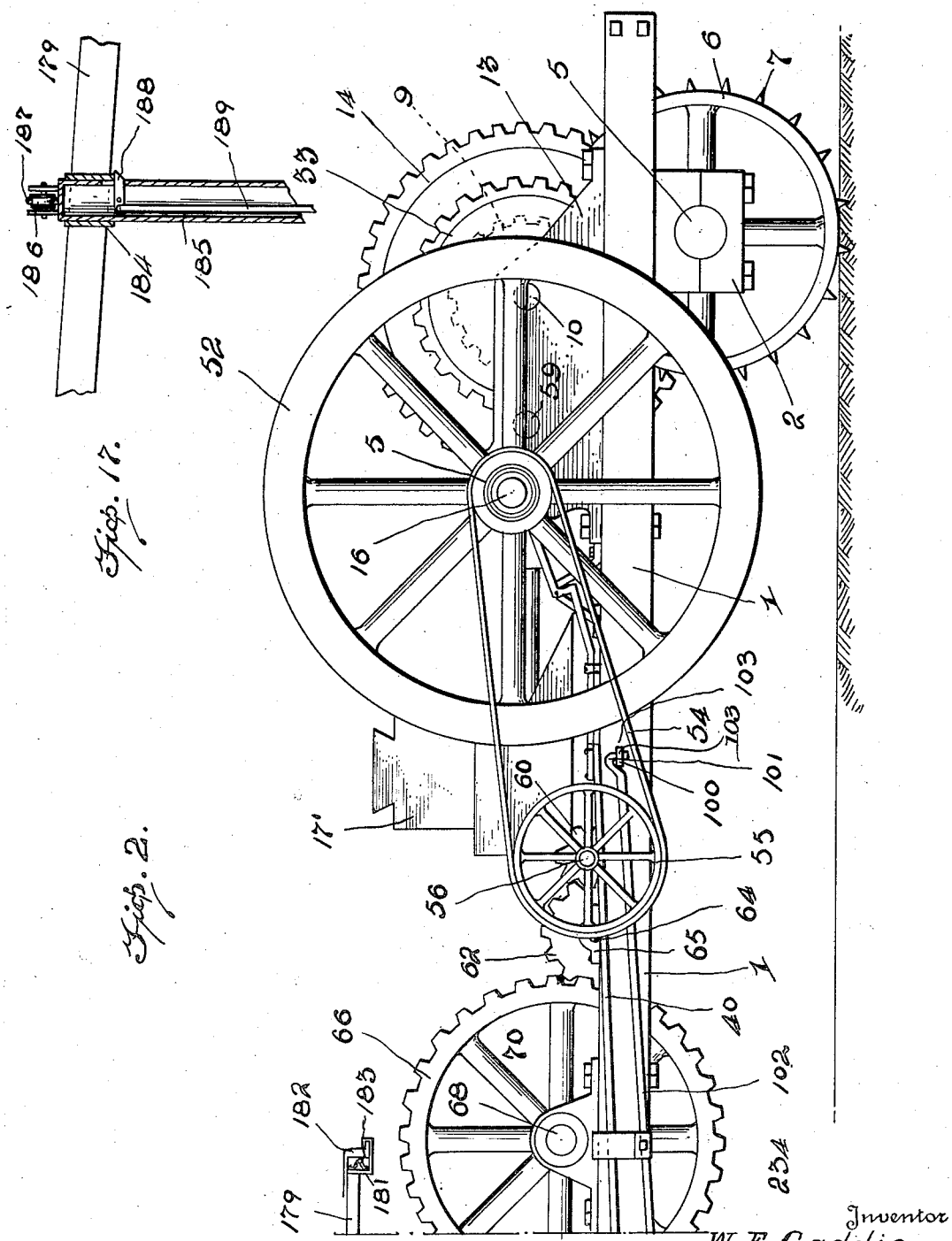

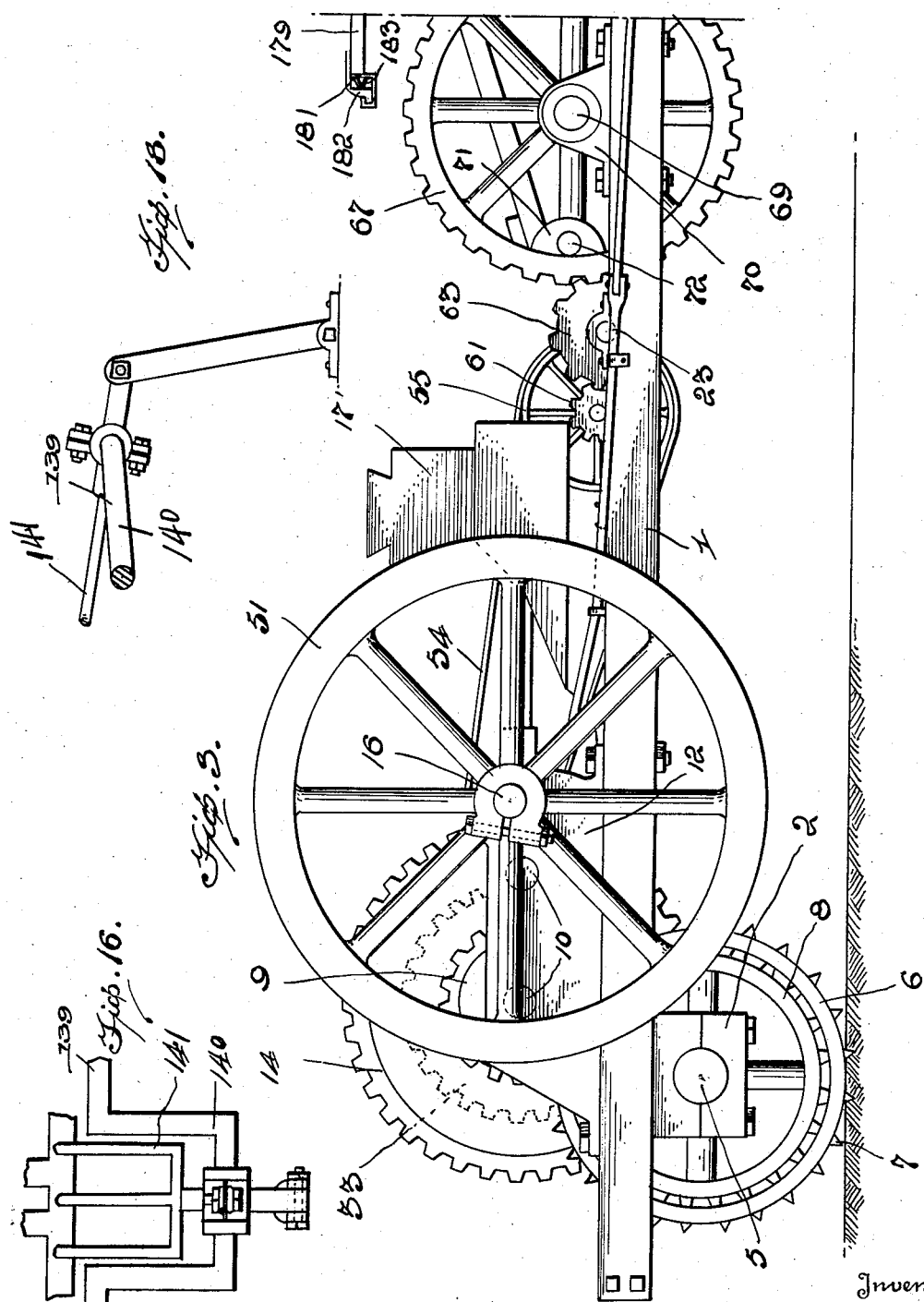

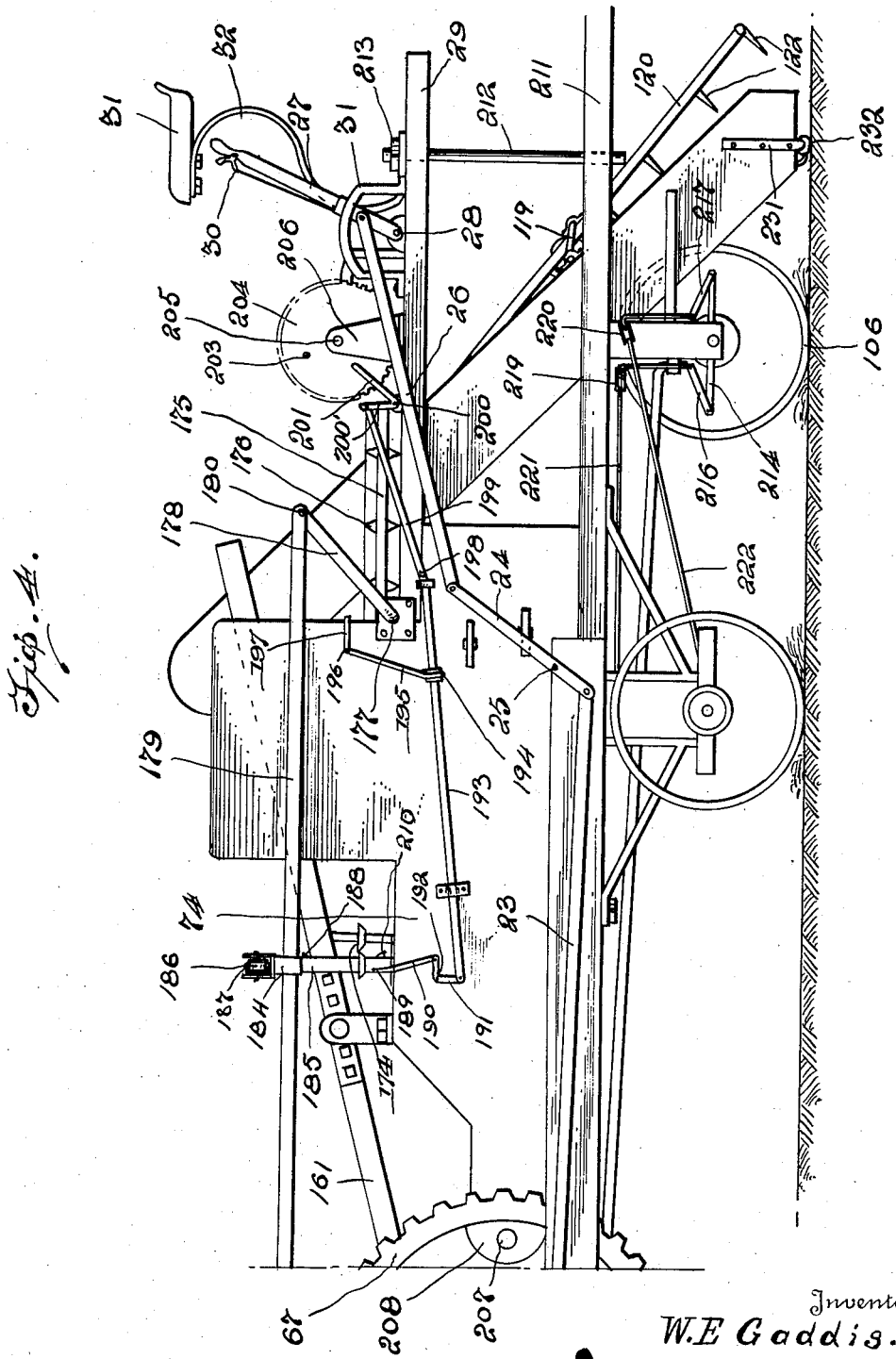

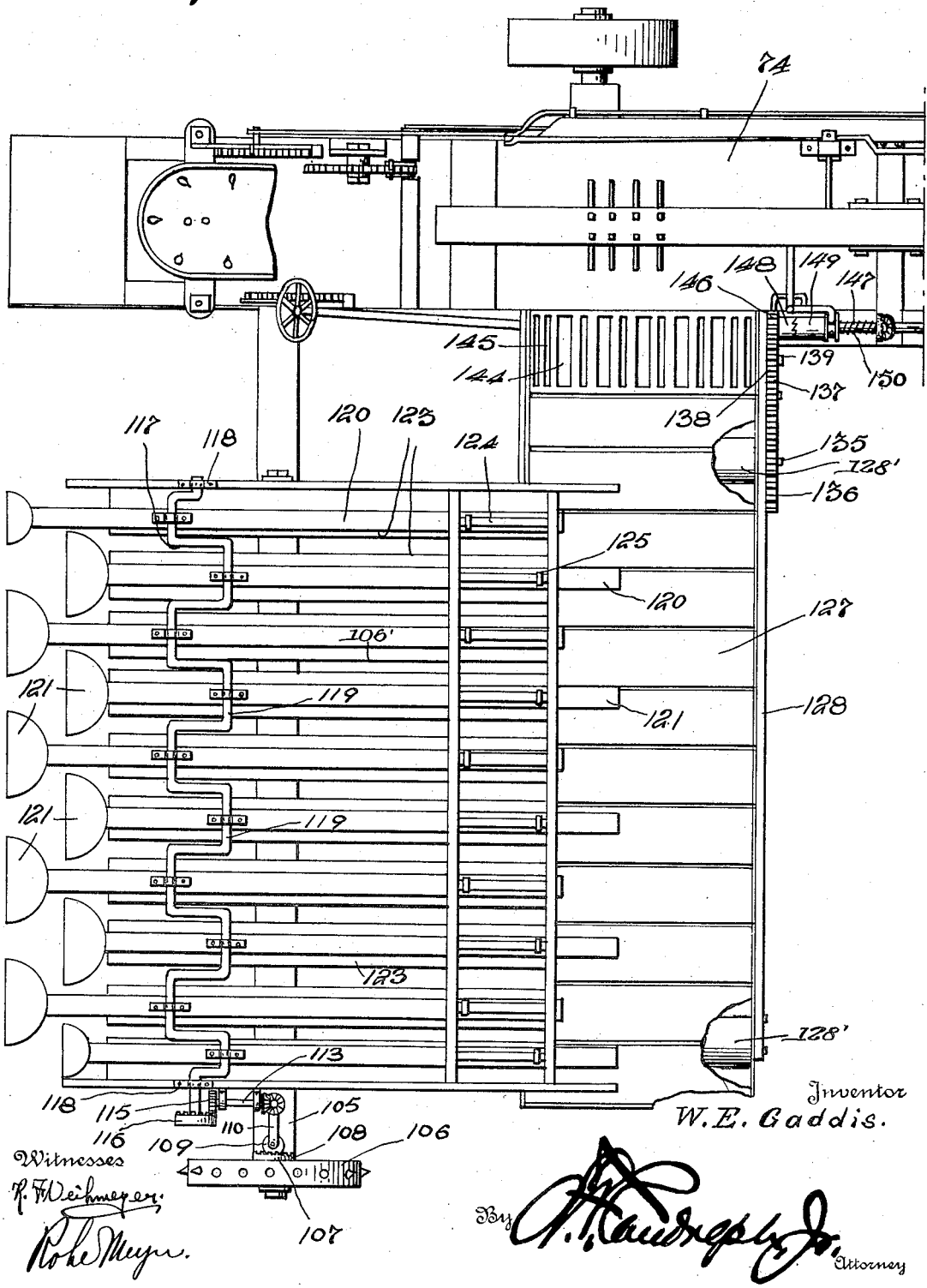

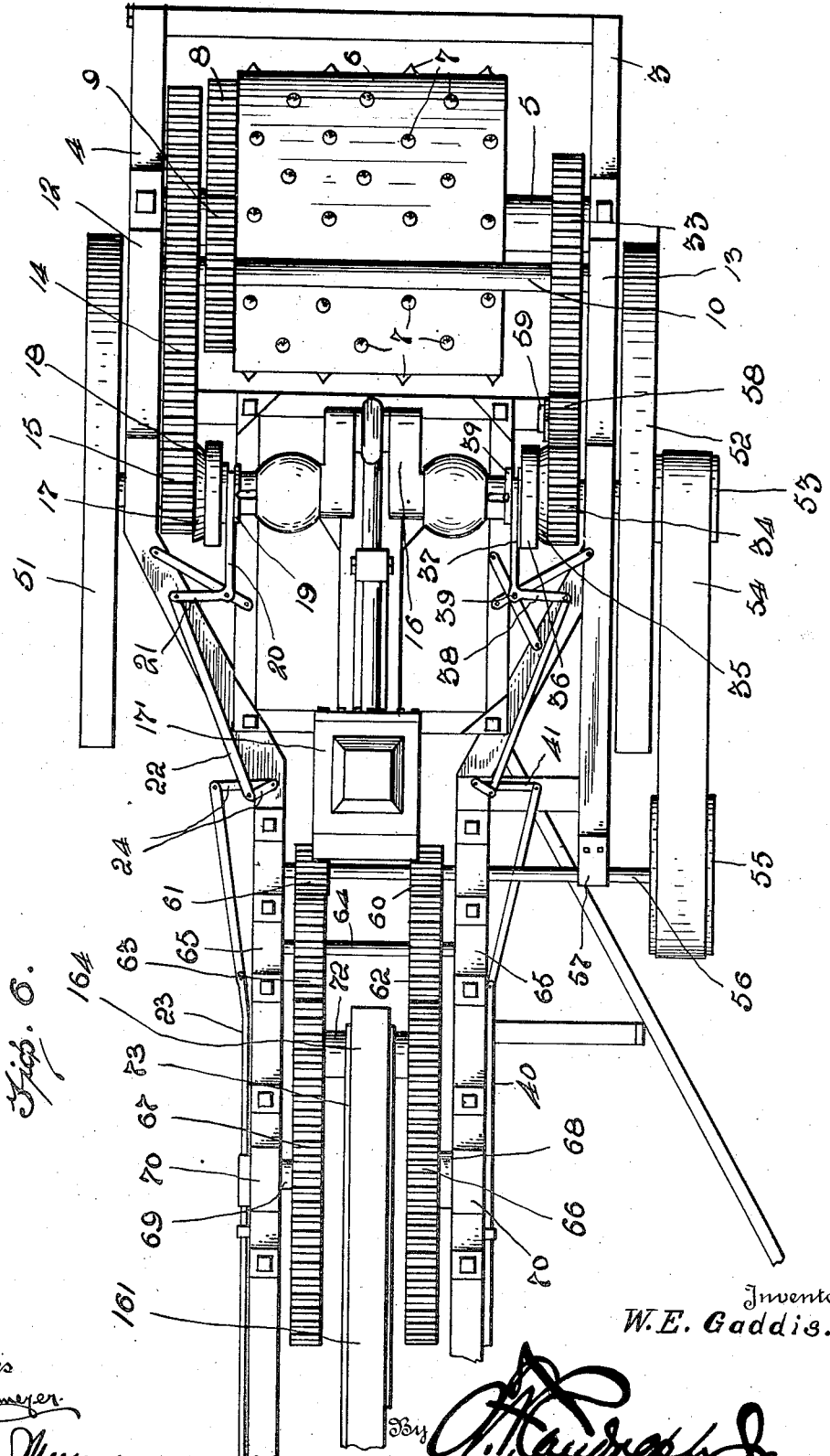

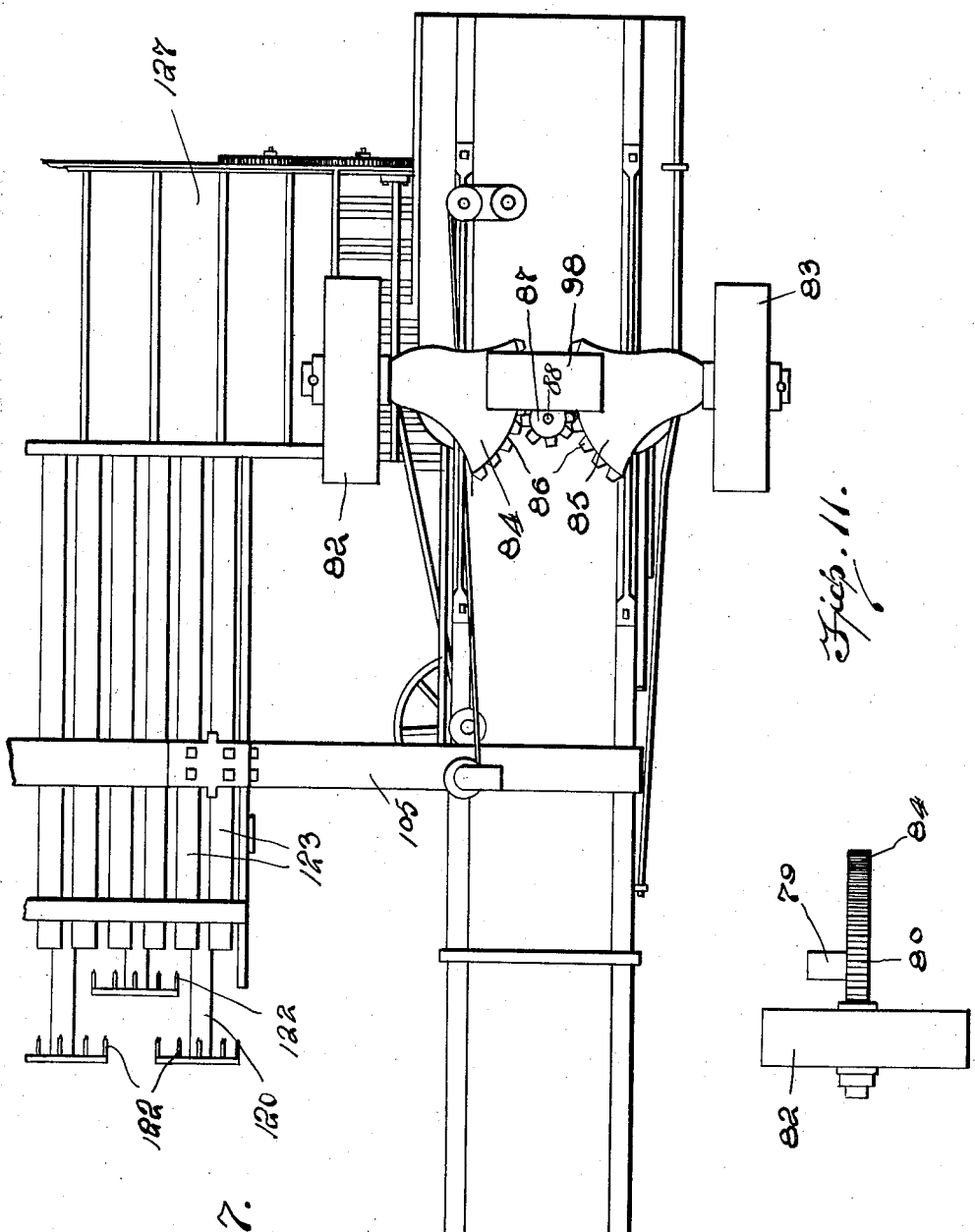

W. E. GADDIS.
HAY RAKE AND BALER.
APPLICATION FILED OCT. 2, 1915.
1,212,044.
Patented Jan. 9, 1917.
9 SHEETS—SHEET 8.
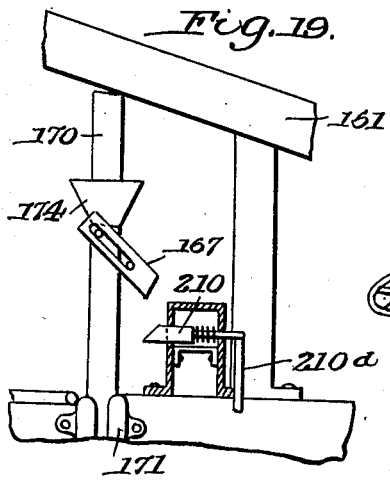
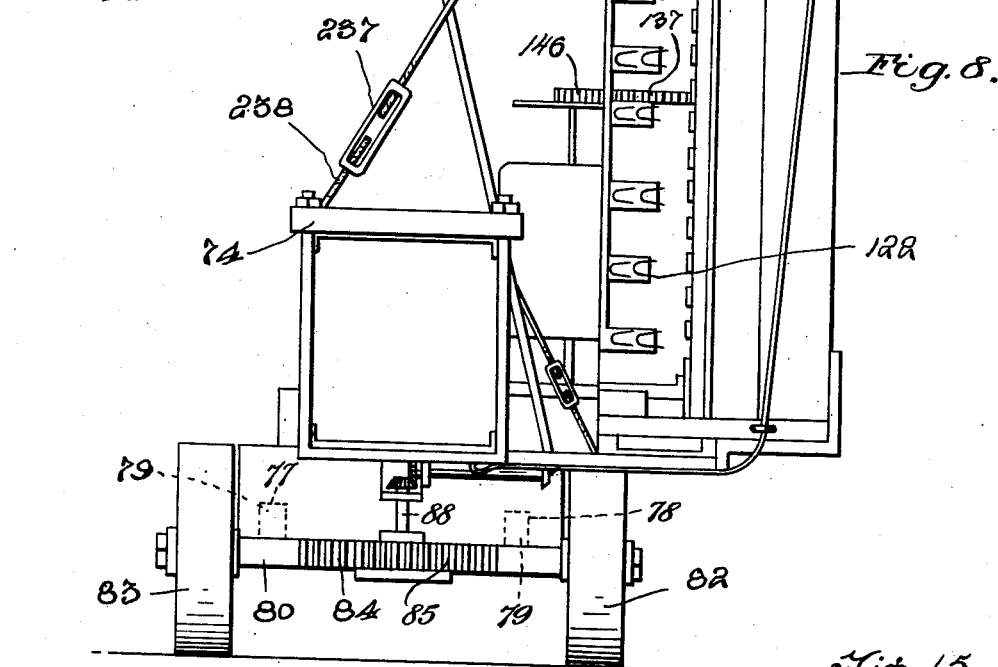
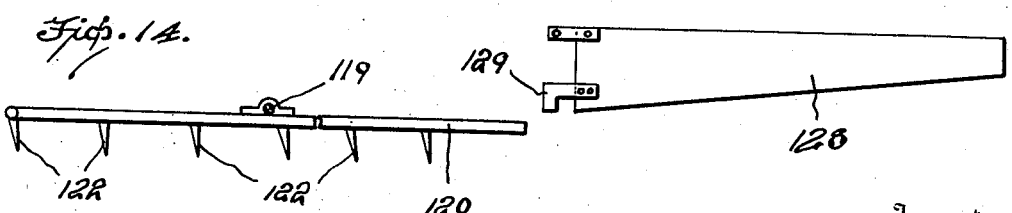
Inventor
W. E. Gaddis.
Witness

W. E. GADDIS.
HAY RAKE AND BALER.
APPLICATION FILED OCT. 2, 1915.

1,212,044.

Patented Jan. 9, 1917.
9 SHEETS—SHEET 9.

Witnesses
R. F. Oeihmeyer
Rohe Meyer

Inventor
W. E. Gaddis.
By _____ Attorney

UNITED STATES PATENT OFFICE.

WALTER E. GADDIS, OF CLINTON, ILLINOIS.

HAY RAKE AND BALER.

1,212,044.  Specification of Letters Patent.  Patented Jan. 9, 1917.

Application filed October 2, 1915. Serial No. 53,803.

*To all whom it may concern:*

Be it known that I, WALTER E. GADDIS, a citizen of the United States, residing at Clinton, in the county of Dewitt and State of Illinois, have invented certain new and useful Improvements in Hay Rakes and Balers; and I do hereby declare the following to be a full, clear, and exact description of the invention, such as will enable others skilled in the art to which it appertains to make and use the same.

This invention relates to a machine for gathering or raking hay from wind rows, or swaths, and baling the hay in standard size bales for marketing, and the primary object of the invention is to provide a device of this nature which will greatly facilitate the harvesting of hay or like agricultural products, and which will materially decrease the labor and time necessary for properly preparing the hay for market.

An object of this invention is to provide a combined hay gatherer or rake and baler of the traction type, which may be self-propelled over a field for gathering the hay therefrom and which includes a plurality of reciprocably movable arms having tines formed upon their lower ends for engaging the hay in the wind rows or swaths and depositing it upon suitable conveyers, which carry the hay to a baling mechanism, and further to provide means for operating the hay pickup members by the prime mover of the device, and means for throwing the hay rakes or pickup members into or out of operation.

A still further object of this invention is to detachably connect the gathering construction to the baling construction, so that the former may be disconnected from an operative position and attached to or supported by the baling structure, for facilitating the transportation of the device.

Another object of this invention is to provide automatically acting means for cutting off the feeding of the hay into the hopper of the baling construction, so as to eliminate the possibility of the clogging of the feeding arm or mechanism by the hay passing upwardly over the conveyer into the hopper.

Another object of this invention is to provide means for automatically moving the bale dividing board into and out of operative positions, during the formation of a bale, said means being timed for uniformly sizing the bales.

Another object of this invention is to provide means for reversing the direction of travel of the hay baler and gatherer, as desired, and also to provide means for steering the device.

With the foregoing and other objects in view this invention consists in such novel features of construction, combination and arrangement of parts as will be hereinafter more fully described, illustrated in the accompanying drawings and claimed.

In describing the invention in detail, reference will be had to the accompanying drawings, wherein like characters designate like or corresponding parts throughout the several views, and in which:—

Figure 10:
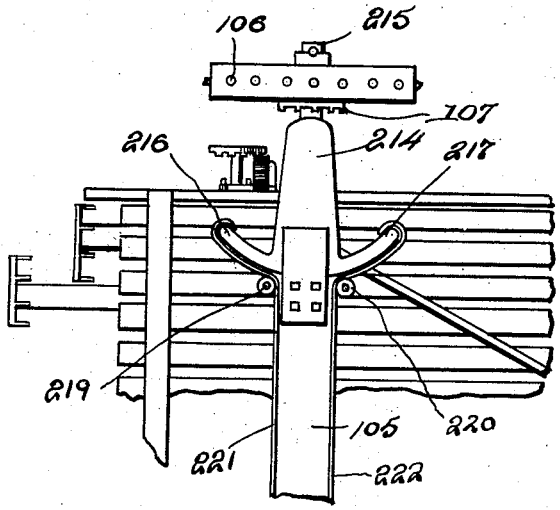
Figure 12:
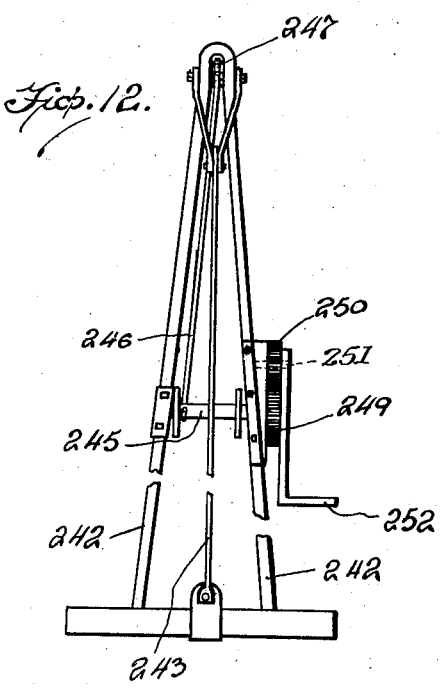
Figure 13:
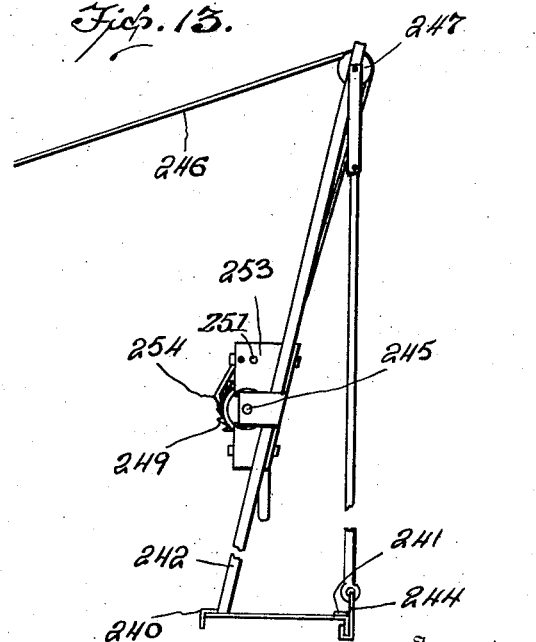

Figure 1 is a side elevation of the gathering and baling section of the improved hay harvesting device, Fig. 2 is a side elevation of the propelling and operating section of the hay harvester, Fig. 3 is a side elevation of the propelling and operating section of the hay harvester, looking from the opposite side to that shown in Fig. 2, Fig. 4 is a side elevation of the baling and gathering section of the hay harvester, showing the side opposite to that illustrated in Fig. 1 of the drawings, Fig. 5 is a plan view of the hay gathering mechanism and a part of the baling mechanism, Fig. 6 is a plan view of the propelling and operating mechanism, and a part of the baling mechanism of the hay harvester, Fig. 7 is a bottom plan of the steering mechanism, showing a part of the gathering mechanism, Fig. 8 is an end view of the harvester, showing the gathering mechanism moved into an inoperative position for facilitating the transportation of the harvester, Fig. 9 is a sectional view through the harvester, showing the manner of steering the same, Fig. 10 is a fragmentary bottom plan view of the gathering mechanism, showing the steering construction therefor, Fig. 11 is a detail view of one of the steering wheels of the harvester, Fig. 12 is a front view of a jack used for raising or moving the gathering structure into the position indicated in Fig. 8, Fig. 13 is a side elevation of the jack used in the structure, Fig. 14 is a detail side elevation of one of the raking or gathering arms, Fig. 15 is a detail of a part of the supporting structure of the hay harvester, Fig. 16 is a detail view of the feeding forks and operating shaft, Fig. 17 is a sectional view of a part of the baling structure, Fig. 18 is a side elevation of one of the feeding forks. Fig. 19 is a detail partly in section of a catch structure employed in the baler construction.

Referring more particularly to the drawings, 1 designates the supporting body or chassis of the hay harvesting machine, which has axle bearing boxes 2 secured to the under surfaces of the forward ends of the side rails 3 and 4 thereof, in which is rotatably mounted the front axle 5 of the harvester. A master wheel 6 is mounted upon the axle 5, and it has a plurality of spurs or grouters 7 secured to or formed upon the periphery thereof for preventing the slipping of the wheel during the rotation thereof.

The master wheel 6 has a gear 8 secured to one end thereof, which meshes with a gear 9. The gear 9 is mounted upon a shaft 10, which is rotatably supported by bearing blocks or pillow blocks 12 and 13, which are mounted upon the upper edges of the side rails 2 and 3. The shaft 10 has a gear 14 mounted thereon, which is of greater diameter than the gear 9, and meshes with a pinion 15 which is mounted upon the crank shaft 16 of the prime mover 17'. The gear 15 is loosely mounted upon the crank shaft 16 and it has a clutch cone 17 formed upon one side thereof, which is adapted for coaction with a clutch shell 18, for rotating the pinion 15 synchronously with the crank shaft 16. The clutch shell 18 has a channeled collar 19 formed thereon, to which is connected the forked arms 20 of a bell crank lever 21. The bell crank lever 21 has an arm or bar 22 connected thereto, which bar is in turn connected to a rod 23 by means of a series of links illustrated at 24. The rod 23 extends rearwardly along the side of the supporting frame of the harvester, and is connected to an evener bar 24, which is pivotally connected at 25, to the body of the machine. A lever 26 is connected to the evener bar 24, and to a lever 27. The lever 27 is pivotally connected at 28 to the platform 29, which forms a part of the baling structure, as will be hereinafter more fully described. The lever 27 has the usual type of dog mechanism 30 carried thereby, which co-acts with a quadrant 31, for holding the lever in various adjusted positions. By oscillatory movement of the lever 27, the clutch shell 18 may be moved into or out of engagement with the clutch cone 17, for causing the pinion 15 to rotate with the crank shaft 16, if so desired, which will rotate the gear 14, and consequently the axle 5 and the master wheel 6, by the operation of the prime mover 17' for moving the harvester forwardly.

The lever 27 is positioned in close proximity to a seat 31, of the ordinary construction, which is supported above the platform 29, by the ordinary type of resilient or spring supporting arm or standard 32.

The shaft 10 has a gear 33 mounted thereon, which meshes with a pinion 34. The pinion 34 is also loosely mounted upon the crank shaft 16, upon the opposite side of the crank section thereof from the pinion 15. The pinion 34 has a clutch 35 formed upon one face thereof, which is adapted for coaction with a clutch shell 36, which is feathered upon the crank shaft, so that when the clutch shell 36 is moved into engagement with the clutch cone 35, the pinion 34 will be rotated synchronously with the crank shaft 16. A forked arm 37 of a bell crank lever 38 is connected to the channeled collar 39, which is formed upon the shell 36. The bell crank lever 38 is pivotally supported at 39, by any suitable type of supporting structure, and it is connected to a rod 40, by suitable leverage and links, as is indicated at 41 in Fig. 6 of the drawings. The rod 40 extends rearwardly along the supporting frame 1 of the harvester, and is connected to an evener lever 42, which is pivotally supported at 43, by the supporting structure 1. The lever 42 is connected by means of levers 44, 45 and a bar 46, to a lever 47, which is pivotally supported at 48, by the platform 29. The lever 47 has the ordinary type of dog mechanism 49 carried thereby, which co-acts with a quadrant 50 for holding the levers in various adjusted positions. When the lever 47 is operated, for throwing the clutch shell 36 into engagement with the clutch cone 35, the pinion 34 will be rotated by the rotation of the crank shaft 16, which will rotate the shaft 10, and consequently the axle 5 and the wheel 6, for reversing the direction of travel of the harvester.

The prime mover 17' may be of any desired type of internal combustion engine, steam engine or the like, this feature depending upon the desires of the person using the harvester. The shaft 16 has balance wheels 51 and 52 mounted upon the outer ends thereof. A pulley 53 is also mounted upon the shaft 16 exteriorly of the balance wheel 52. A belt 54 passes about the pulley 53 and about a pulley 55, which pulley is mounted upon a shaft 56. The shaft 56 is supported by suitable supporting brackets 57, and is provided for supplying the necessary power to the various parts of the device, which will be hereinafter more fully described.

A pinion 58 is mounted upon a stub shaft 59, carried by the pillow block 13, and is interposed between the gear 33 and the pinion 34, for rotating the shaft 10 in a direction reversely to the direction of rotation of the shaft, when it is rotated by the meshing of the gear 14 and the pinion 15.

The shaft 56 has pinions 60 and 61 mounted thereon, which mesh with gears 62 and 63 carried by a shaft 64. The shaft 64 is rotatably supported by suitable bearings 65, which are mounted upon the upper edges of the supporting structure 1 of the harvester. The gears 62 and 63 mesh with gears 66 and 67, which are of greater diameter than the gears 62 and 63. The gears 66 and 67 are mounted upon stub shafts 68 and 69, which extend outwardly from the outer sides of the gears and are rotatably journaled in bearings 70.

The gears 66 and 67 have lugs 71 formed thereon and extending inwardly toward the center of the wheels. The lugs are formed in corresponding positions with respect to each other, and have a bar 72 connected thereto, which extends from one of the gears to the other, as is clearly shown in Fig. 6 of the drawings. The bar 72 has the plunger rod 73 of the hay baler construction attached thereto, for reciprocating the compressing plunger (not shown) upon rotation of the gears 66 and 67.

The plunger bar extends rearwardly into the baling structure 74, which is of the ordinary construction in baling hay.

The supporting structure 1 has a bolster 75 secured thereto and supported by suitable braces 76. The bolster 75 is provided with recesses 77 and 78 formed therein and extending upwardly from the lower edge of the same, which recesses are provided for receiving the upstanding lugs 79, which are formed on the stub axles 80 and 81. The axles 80 and 81 have supporting wheels 82 and 83 removably mounted on their spindle ends and they have segmental racks 84 and 85 formed upon their inner ends, as is clearly shown in Fig. 7 of the drawings. The teeth 86, which are formed upon the rack sections 84 and 85 of the stub axles 80 and 81, mesh with the peripheral teeth of a pinion 87. The pinion 87 is mounted upon the lower end of a shaft 88 which is supported along side the rear edge of the bolster 75, by any suitable type of supporting strap 89. The bolster 75 is recessed, as is shown at 90, to permit of the unimpeded rotation of the miter gears 91 and 92. The miter gear 91 is mounted upon the upper end of the shaft 88, and meshes with the miter gear 92, which is mounted upon a shaft 93. The shaft 93 extends across the rear face of one side of the bolster 75, and has a worm gear 94 mounted thereupon, which meshes with a worm screw 95. The worm screw 95 is mounted upon a steering post 96, which has a steering wheel 97 of the ordinary type mounted upon its upper end. The steering wheel 97 is positioned in close proximity to the seat 31.

A plate 98 is positioned beneath the under surfaces of the rack sections 84 and 85, and is held in place by a bolt 99 which extends upwardly into the bolster 75.

The supporting structure 1 has an eye 100. The eye 100 is adapted for receiving the hooked end 101 of a brace 102, and it has a set screw 103 carried thereby, for engagement with the hooked end 101 for preventing rotation of the hook or accidental removal of the same from the eye 100.

The brace rod 102 extends outwardly obliquely to the longitudinal lines of the supporting frame 1, and has its rear end inserted through an eye 104 which is carried by the bolster or truck structure 105 of the hay gathering structure 106'.

The supporting structure or bolster 105 of the gathering mechanism, has a supporting traction wheel 106 rotatably carried by the outer end thereof. A crown gear 107 is formed upon the inner side of the wheel 106, and the teeth 108 thereof mesh with a spherical gear 109. The spherical gear 109 is mounted upon a shaft 110. The shaft 110 has a bevel gear 111 mounted upon its upper end which meshes with a bevel gear 112. The bevel gear 112 is mounted upon a shaft 113, which extends transversely to the direction of the shaft 110, and is supported by the structure 106, by suitable straps 114, as is clearly shown in Fig. 1 of the drawings.

The shaft 113 has a gear 115 mounted upon the end opposite to the bevel gear 112, which meshes with a crown gear 116. The crown gear 116 is mounted upon one end of a crank shaft 117. The crank shaft 117 is carried by bearings 118, and extend entirely across the supporting frame of the gathering or raking structure 106.

The crank shaft 117 is provided with a plurality of alternately extending cranks 119, which have bars 120 connected thereto. The bars 120 have heads 121 mounted upon their rear lower ends, to which heads are secured a plurality of tines 122, which are adapted for engaging the hay which is piled in wind rows or swaths, for picking up the hay and depositing it upon the lower ends of the slats 123, which forms the bottom of the pickup or gathering structure.

The upper ends of the bars 120 are slidably connected to bars 124, by means of clips or straps 125. The gathering arms 120 project beyond the upper edges or ends of the supporting frame or structure 106, and over a conveyer 127. The arms 120 have rake teeth secured to their undersurfaces, at predetermined spaced intervals along their length, for engaging the hay and moving it upwardly over the slats 123, for deposit upon the conveyer 127. The conveyer 127 is carried by a frame 128. Eye rods or straps 132 are secured to the bracing rods 133 upon the lower ends of which the eyes 130 are formed, and they are inserted through the eyes 131 for preventing accidental disconnection between the eyes 130 and 131, as is clearly shown in Fig. 1 of the drawings.

The conveyer 127 passes about the usual type of rollers 128', which are carried by the sides of the structure 128. The innermost of the rollers is mounted upon a shaft 135, which has a gear 136 mounted thereon. The gear 136 meshes with a gear 137, which in turn meshes with a second gear 138 carried by a crank shaft 139. The crank shaft 139 has alternate crank sections 140 formed thereupon, to the wrists of which are connected feeding forks 141. The feeding forks 141 have collars 142 formed upon the ends of the handles thereof, which engage the wrists of the crank 140. A plurality of tines 143 are formed upon the outer free ends of the handles of the forks, and they are provided for passing upwardly through openings 144 which are formed in a plate 145. The plate 145 is carried by the inner ends of the sides of the supporting structure 128 and is positioned in close proximity to the baling structure 74, so that the hay, after passing off the conveyer 127, will be engaged by the forks 141 and fed inwardly into the hopper of the baling structure.

The gear 138 meshes with a gear 146, which is mounted upon a shaft 147. The gear 146 has a clutch section 148 formed upon its outer side, which is adapted for coaction with the clutch section 149, for rotating the gear upon rotation of the shaft 147, the gear being loosely mounted upon the shaft. The clutch section 149 is feathered upon the shaft 147, for sliding movement thereon, and it is normally held in engagement with the clutch section 148 by a spiral spring 150, which is coiled upon the shaft 147 and engages a bearing 151 in which the shaft rotates. The sliding movement of the clutch section 149 is guided by a pin 152 which is carried by the shaft and is seated in a slot 153 formed in the clutch section 149.

The shaft 147 has a crown gear 152 mounted upon its outer end which meshes with a beveled pinion 153. The pinion 153 is carried by a shaft 154 which is rotatably supported by suitable brackets or straps 155 along one side of the baling structure 74.

A beveled gear 156 is mounted upon the lower end of the shaft 154 and meshes with a beveled gear 157. The beveled gear 157 is mounted upon a shaft 158, which has a gear 159 mounted thereon. The gear 159 meshes with the gear 66, and is rotated thereby.

The sides of the hay baling structure 74 have brackets 160 secured thereto, which pivotally support a feeding arm 161. The feeding arm 161 has its forward end positioned over the mouth 162 of the baling press. The forward end of the feeding arm 161 has a plurality of fingers 163 connected thereto, and extending downwardly therefrom, which fingers are provided for packing and shoving the hay downwardly into the baling chamber of the press for compression therein. The rear end of the feeding arm 161 is positioned in the path of the rod or shaft 72, and it has a balancing weight 164 mounted thereon.

The clutch section 149 has a channeled collar 166 formed thereon, in which the forked end of a lever 167 is mounted. The lever 167 is pivotally supported at 168, and has its upper end connected by means of a slot and pin connection, shown at 169, to a rod 170, which is slidably supported by a bracket 171. The upper end of the bar 170 is positioned in the path of the feeder arm 161, so that when the feeder arm moves downward, for forcing the hay downwardly into the compression chamber of the baler, it will move the pin 170 downwardly and rock the lever 167, throwing the clutch section 149 out of engagement with the clutch section 148, which will prevent the operation of the conveyer 127 and the feeding forks 141, and prevent the hay from being piled upon the upper surface or top of the feeder arm during its downward movement.

The baling structure 74 requires three divider boards or blocks, the same as any ordinary baler, which divider boards are placed into a frame 175. The frame 175 is pivotally connected to the baler and lies horizontally on the top of the baling structure just back of the hopper mouth.

The frame 175 has its pivoted end supported by a rod 177, one end of which is angled upwardly, as is shown at 178. An arm 179 is pivotally connected at 180 to the angled end 178 of the rod 177, and it extends forwardly along the harvester construction. A spring hook 181 is secured to the forward end of the arm 179. A guard plate 182 is also secured to the outer free end of the arm 179, and extends downwardly, forming a guard for the spring hook 181. A flat spring 183 is positioned between the guard plate 182 and the spring hook 181, as is clearly shown in the drawings, for properly tensioning the spring hook.

The arm 179 is slidably mounted in a sleeve 184, which is slidably supported upon a standard 185. The sleeve 184 is preferably constructed of two sections, one of which is pivotally connected to the other. One section slidably supports the rod 179, and the other section of the sleeve is slidably mounted upon the standard 185.

The standard 185 is hollow and has a sheave wheel 186 rotatably supported upon its upper end, about which a cable 187 passes. The cable 187 is secured to the sleeve 184 and to the feeding arm 161.

The hollow standard 185 has a catch structure 188 positioned therein, which is spring controlled, and in which the flap or latch is hingedly supported, so as to permit of an upward movement of the sleeve 184, over the same, but to prevent a downward movement of the sleeve upon the standard, when the catch is in a sleeve supporting position. The catch has a rod 189 secured thereto, which extends downwardly through the hollow standard 185, and is provided for drawing the protruding end of the catch 188 into the standard 185, when the rod is pulled downwardly, thus permitting the sleeve 184 to slide downwardly upon the standard. The rod 189 is connected, by means of the link 190 to a bell crank lever 191, which is pivotally connected at 192 to the supporting structure of the baler. A rod 193 is also connected to the pivotally supported bell crank lever 191 and extends rearwardly along the supporting structure of the baler. The rod 193 is rotatably and slidably supported by a bearing 194, which has anti-friction balls included therein, and which is formed upon the lower end of a rod 195. The rod 195 has a universal connection at 196 with a supporting bracket 197, so as to permit of a longitudinal movement of the rod 193.

The rod 193 is pivotally connected at 198 to a second rod 199. The rod 199 is in turn connected to a shaft 200 by means of an arm 200', which shaft is rotatably supported upon the platform 29 and has a trip arm 201 formed upon one end thereof. The trip 201 is positioned in the path of a pin 203, which is carried by and projects transversely from one side of a bale measuring wheel 204. The wheel 204 is rotatably supported by a shaft 205, which shaft is in turn supported by suitable supporting brackets 206 carried by the platform 29.

The spring hook 181 is adapted for engagement with a pin 207, which is formed upon a lug 208. The lug 208 is secured to the inner surface of the rim of the gear 67, diametrically opposite of the lug 71.

The pin 203 is positioned upon the wheel 204, so that when the feeder arm 161 is engaged by the shaft 72, thereby slacking the cable 187, it will strike the trip 201. When the pin 203 strikes the trip 201, it rocks the shaft 200, which will move the rods 199 and 193 longitudinally, rocking the bell crank 191 and moving the rod 189 downwardly. The downward movement of the rod 189 will move the protruding end of the latch 188 into the hollow standard 185, which will release the sleeve 14, and permit the same to move downwardly upon the standard 185. When the sleeve 184 moves downwardly upon the standard 185, it carries the arm 179 therewith, moving the spring hook 181 downwardly and into engagement with the pin 207. The peculiar formation of the spring hook 181, will cause the same to engage the pin 207, so that upon the rotation of the gear 67, the arm 179 will be moved upwardly for rocking the shaft 177, and moving the frame 175 upwardly out of the compressing chamber of the baler structure into its normal horizontal position. A dividing board carried by the frame 175 is moved downwardly in a vertical position within the compression chamber of the baler, upon the downward movement of the arm 179 and the sleeve 184, which will divide the hay in the compressing chamber into the proper sized bales.

A second catch structure 210 is provided which is mounted on the right hand side of the baler and is controlled by a trip 210ª. The trip 210ª is operated by a pin 210ᵇ that is carried by the measuring wheel 204. The trip 210ª is connected to a rotary shaft 210ᶜ which extends across the top of the platform 29. This trip is connected to a rod 210ᵈ that extends forwardly along the baler up to the spring catch 210. When the trip 210ª is operated, it will pull the rods far enough rearwardly to cause the spring catch 210 to come in contact with the cone 174 on the rod 170. The spring will allow the lug 174 to pass downwardly past this catch, but it will not permit the same to move upwardly past it until the catch is released, owing to the fact that the catch has its straight face extending downwardly, as is clearly shown in Figs. 1 and 4 of the drawings. The catch 210 is connected to the pin 210ᵇ so that when the trip 210ª is operated, by the pin 210ᵇ, it will move outwardly and engage the lug or collar 174 and hold the clutch segment 149 out of engagement with clutch segment 142, which will arrest the operation of the conveyer, thus giving the plunger time to push all of the loose hay clear of the dividing board or block. The clutches are held out of engagement while the compressing plunger, which is attached to the plunger rod 73 for compressing hay within the baling chamber, is making two strokes and upon the third stroke of the plunger, the trip will be automatically set, causing the bale to be pushed back farther, and also causing the measuring wheel to turn far enough to release the trips 210ª and 201, positioning the machine for starting on a new bale.

The platform 29 coöperates with a bottom platform 211, for securely clamping the hay after it has been compressed in bales, while being tied. The platform 29 and the base platform 211 are connected by bolts 212, the upper ends of which have nuts 213 mounted thereon. By the adjusting of the nuts 213 upon the bolts 212, the difference between the platform 29 and the auxiliary platform 211 may be regulated for efficiently clamping a bale of hay and permitting the same to be removed therefrom.

The supporting wheel 106 of the gathering structure of the harvester is rotatably supported upon the spindle 215 which is formed upon the outer end of the plate 105. The plate 105 has arcuate arms 216 and 217 formed upon its inner end, and it is slidably carried by plates 218, which are secured to the under surface of the supporting arm 105. The bar 105 has pulleys 219 and 220 rotatably carried by the side edges thereof, about which cables 221 and 222 pass. The cables 221 and 222 pass along the outer edges of the arcuate arms 216 and 217 and about the ends of the arms, being secured to the inner edges of the arms a short distance inwardly from their outer ends, as is clearly shown in the drawings.

The cables 221 and 222 pass about guiding pulleys 223 and 224, which are carried by the supporting structure 1 of the baler, and they are secured to the segment 84, upon the spindle end of which the supporting wheel 82 is mounted for steering the wheel 106 synchronously with the steering of the wheels 82 and 83.

The supporting frame 106 has depending straps 230 and 231 secured to the lower ends of the opposite sides thereof, which rotatably support rollers 232, which travel upon the ground over which the harvester is passing.

The supporting structure 1 of the hay harvester has angle brackets 233 and 234 secured to one side thereof, which are provided for receiving and supporting the gathering structure 106, when the harvester is mounted for travel upon a roadway, as is shown in Fig. 8 of the drawings. When the pickup or gathering structure 106 of the harvester is supported by the brackets 233 and 234, a supporting rod 235, which has a hook 236 upon one end thereof, is attached to the wheel 106, and to a turn-buckle 237. The turn-buckle 237 is connected to a rod 238 which is supported by the body of the baler structure 74, for rigidly supporting the gathering structure in a vertical position along side the baling structure. The upper side or top of the baler structure 74 has angle irons 240 and 241 extending longitudinally along the side edges thereof, as is shown in Fig. 13.

Figs. 12 and 13 show a hoisting jack which is utilized for lifting or moving the gathering structure into a vertical position along side the baler structure. The jack structure illustrated in Figs. 12 and 13 comprises supporting legs 242 and 243. The leg 243 has a hook 244 formed thereon, which is adapted for engaging the angle iron 241, for supporting the jack structure above the baling structure.

The supporting legs 242 which have their upper ends converging, rotatably support a shaft 245, to which is connected one end of a cable 246. The cable 246 passes about a pulley 247, which is rotatably supported by the upper ends of the legs 242.

The shaft 245 has a gear 249 mounted upon one end thereof, which meshes with a second gear 250 carried by a stub shaft 251. The stub shaft 251 has a crank handle 252 mounted thereon for facilitating the rotation thereof, for winding or unwinding the cable 246 upon the shaft 245. A plate 253 is carried by one of the legs 242 and it has a pawl 254 pivotally supported thereby, for engaging the teeth of the gear 249, for preventing reverse rotation of the same, while winding the cable upon the shaft 245, for moving the gathering structure 106 into a vertical position.

In gathering hay from a field, where the hay has been cut and is either lying in swaths or has been raked into wind rows, the harvester is driven into the field, after which the gathering structure 106 is moved from a vertical position, as is shown in Fig. 8, into a position to one side of the baling structure, as is shown in Fig. 5. The operation of the prime mover 17' of the device, will propel the harvester over the field, by the rotation of the master wheel 6, in the manner heretofore described, and the direction of travel of the harvester is regulated by the operation of the levers 27 and 47 and the clutch shells 18 and 36, as has been heretofore described. The traction of the wheel 106 will rotate the crank shaft 117, in the manner heretofore described, which will cause the rake teeth 122 to engage the hay, and upon the upward movement of the bars 120, the hay will be carried upwardly upon the slats 123, where it will be engaged by the different teeth upon the under surfaces of the bars 120. The rotation of the crank shaft 117 will move the bars 120 upwardly, so that the teeth will become disengaged from the hay, during their return movement. The continued opertions of the bars 120 will carry the hay upwardly over the slats 123 and deposit it upon the conveyer 127, which will carry the hay across to the end thereof, where it will be engaged by the forks 141 and deposited within the upper open end or mouth of the compressing chamber of the baling structure. The hay will be securely tamped or forced downwardly into the baling structure by the operation of the arm 161. As soon as the pin 203 strikes the trip 201, it mechanically releases the arm 179 which drops downward and engages with the pin 207 and is pulled forward, thus rocking the arm 178 and lifting the block rack with the block which has been placed therein, vertically under the back end of the feeder arm 161. When the feeder arm 161 comes down, the divider block is forced downward into the chamber of the baler. Then as soon as the plunger pushes the divider block into position, it causes the bale to be forced rearwardly a short distance, which rotates the measuring wheel 204 a distance sufficiently to release the trip 201 from the pin 203. The releasing of the pin 201 will allow the block frame 175 to drop back in a horizontal position ready for another divider block to be inserted therein.

The hay is prevented from piling upon the top of the arm 161, by the movement of the clutch segment 149 out of engagement with the clutch segment 148, which will stop or arrest the operation of the conveyer 127, as has been previously described. The plunger of the hay baler, which is connected to the shaft or pin 72, will securely pack the hay within the compressing chamber, against the dividing board or block 175, when it is in a vertical position within the chamber. After the proper size bale has been formed, the various mechanisms heretofore described will be operated for moving the board 175 into a horizontal position out of the baling chamber, which will permit the plungers to clean the chamber, forcing the hay outwardly between the platforms 29 and 211, where it is tied in any desired manner, after which it is forced outwardly beyond the ends of the platforms, and may be loaded upon a wagon, for transportation to a storage building or to market, as desired.

What is claimed is:—

1. In a hay rake and baler, a supporting frame, an auxiliary supporting frame carried by and at one side of said supporting frame for movement into a vertical nonoperative position along side of said supporting frame.

2. In a hay rake and baler, a supporting frame, an auxiliary supporting frame carried by and at one side of said supporting frame for movement into a vertical nonoperative position along side of said supporting frame, a crank shaft carried by said auxiliary supporting frame, a plurality of rake arms connected to said crank shaft, and raking teeth secured to the ends and the under surfaces of said bars.

3. In a hay rake and baler, a supporting frame, an auxiliary supporting frame carried by and at one side of said supporting frame for movement into a vertical nonoperative position along side of said supporting frame, a crank shaft carried by said auxiliary supporting frame, a plurality of rake arms connected to said crank shaft, raking teeth secured to the ends and the under surfaces of said bars, a supporting wheel carried by said auxiliary frame, and means operated by the rotation of said supporting wheel for rotating the crank shaft.

4. In a hay rake and baler, a supporting structure, a prime mover, supporting wheels carried by said supporting structure, means for guiding said supporting wheels for guiding the traction of said supporting structure, means operatively connecting said prime mover to certain of said supporting wheels for propelling said supporting structure, an auxiliary supporting frame carried by and at one side of said supporting frame for movement into an inoperative vertical position along said supporting structure, a supporting wheel carried by said auxiliary supporting structure, and means operatively connecting the supporting wheels of said supporting structure and the supporting wheel of said auxiliary supporting structure for synchronously guiding the wheels for steering the hay rake and baler.

5. In a hay rake and baler, a supporting structure, a prime mover, supporting wheels carried by said supporting structure, means for guiding said supporting wheels for guiding the traction of said supporting structure, means operatively connecting said prime mover to certain of said supporting wheels for propelling said supporting structure, an auxiliary supporting frame carried by and at one side of said supporting frame for movement into an inoperative vertical position along said supporting structure, a supporting wheel carried by said auxiliary supporting frame, means operatively connecting said supporting wheels of said supporting structure and the supporting wheel of said auxiliary supporting frame for synchronously guiding said wheels for steering the hay rake and baler, hay gathering means carried by said auxiliary supporting frame, conventional hay baling means carried by said first named supporting structure, and means for feeding the hay from said hay gathering means to said baling means.

6. In a hay rake and baler, a supporting frame, an auxiliary supporting frame carried by and at one side of said supporting frame for movement into a vertical nonoperative position along side said supporting frame, a conventional baling structure carried by said supporting frame, hay gathering means carried by said auxiliary supporting frame, and means for feeding hay from said gathering structure to said baling structure.

7. In a hay rake and baler, a supporting frame, an auxiliary supporting frame carried by and at one side of said supporting frame for movement into a vertical nonoperative position along side said supporting frame, a crank shaft carried by said auxiliary supporting frame, a plurality of rake arms connected to said crank shaft, rake teeth secured to the ends and under surfaces of said arms, a conventional baling structure carried by said supporting frame, and means for feeding hay from said raking teeth to said baling structure.

8. In a hay rake and baler structure, the combination, of a baling chamber, a reciprocatory compressing plunger, means for operating said plunger, a tamping arm operated by said plunger operating means, a pivoted divider board supporting frame, an angled arm connected to said frame, an arm connected to said angled arm, a standard, a sleeve carried by said last named arm and slidably mounted upon said standard, a catch carried by said standard and engaging said sleeve for holding said second named arm against movement, and means operable by the operation of said plunger for releasing said catch to permit said arm to move downwardly for swinging said frame into a divider board feeding position.

9. In a hay baler structure, the combination, of a baling chamber, a reciprocatory compressing plunger, means for operating said plunger, a tamping arm operated by said plunger operating means, a pivoted divider board supporting frame, an angled arm connected to said frame, an arm connected to said angled arm, a standard, a sleeve carried by said last named arm and slidably mounted upon said standard, a catch carried by said standard and engaging said sleeve for holding said second named arm against movement, a measuring wheel, means for rotating said measuring wheel by the operation of said plunger, and means operable by the rotation of said measuring wheel for controlling the operation of said second named arm.

10. In a hay rake and baler structure, the combination, of a hay baling structure including a baling chamber, a compressing plunger, a prime mover, a pair of gears operatively connected to said prime mover and said plunger for operating said plunger, means for feeding hay into said chamber, a clutch mechanism for controlling the operation of said feeding mechanism, a pinion meshing with one of said gears, means operated by said pinion for operating said feeding mechanism, and means connected to said clutch mechanism and operable by the rotation of said gears for automatically arresting operation of said feeding means.

11. In a hay rake and baler structure, the combination, of a hay baling structure including a baling chamber, a compressing plunger, a prime mover, a pair of gears operatively connected to said prime mover and said plunger for operating said plunger, means for feeding hay into said chamber, a clutch mechanism for controlling the operation of said feeding mechanism, a pinion meshing with one of said gears, means operated by said pinion for operating said feeding mechanism, means connected to said clutch mechanism and operable by the rotation of said gears for automatically arresting operation of said feeding means, and means for holding said last named means in a feeding mechanism arresting position during the bale completing stroke of said plunger.

12. In a hay rake and baler structure, the combination, of a hay baling structure including a baling chamber, a compressing plunger, a prime mover, a pair of gears operatively connected to said prime mover and said plunger for operating said plunger, means for feeding hay into said chamber, a clutch mechanism for controlling the operation of said feeding mechanism, a pinion meshing with one of said gears, means operated by said pinion for operating said feeding mechanism, means connected to said clutch mechanism and operable by the rotation of said gears for automatically arresting operation of said feeding means, means for holding said last named means in a feeding mechanism arresting position during the bale completing stroke of said plunger, and means for automatically releasing said arresting means upon the starting of a new bale in said chamber.

In testimony whereof I affix my signature in presence of two witnesses.

WALTER E. GADDIS.

Witnesses:
JAMES M. LEDDEN,
CARRIE M. BRYANT.